United States Patent Office 3,685,959
Patented Aug. 22, 1972

3,685,959
WOOD SEASONING AND MODIFICATION
James L. Dunn, Jr., Lake Jackson, and Harold G. Liddell, Angleton, Tex., assignors to The Dow Chemical Company, Midland, Mich.
No Drawing. Continuation-in-part of application Ser. No. 728,755, May 13, 1968. This application Apr. 24, 1969, Ser. No. 819,518
Int. Cl. B27k 3/08, 3/40
U.S. Cl. 21—7                      16 Claims

ABSTRACT OF THE DISCLOSURE

A process for seasoning and/or modifying wood which comprises impregnating wood to be seasoned with a halogenated hydrocarbon solvent or wood to be seasoned and modified or only modified with a halogenated hydrocarbon solvent which contains a wood modifying chemical e.g., wood preservative, fire retardant and/or colorant, at ambient temperature to about 250° F. under atmospheric or super-atmospheric pressure, removing excess solvent, including excess modifying chemical, from the wood, and subjecting the so-impregnated wood to a heating fluid, e.g., the vapors of water or a halogenated hydrocarbon solvent, to remove the impregnant solvent and, if seasoning, water and removing the so-vaporized solvent and water from association with the wood.

---

This is a continuation-in-part of our prior application Ser. No. 728,755, filed May 13, 1968.

BACKGROUND OF INVENTION

The seasoning and preservation of wood to improve its characteristics for industrial use is widely practiced. Methods of air-drying and kiln-drying green lumber, poles, etc. are not only time consuming but expensive in space requirements and/or utilities. Most efforts to introduce new techniques have met with failure because of inability to dry or season all woods, as well as their expense in capital outlay and operating costs. Thus the practice of air- or kiln-drying is still a widely practiced technique.

In the field of wood preservation, some progress has been made. The creosote oil treatment has given way to some considerable extent to the impregnation with pentachlorophenol dissolved in petroleum oils. This latter process has given way to the salt process where clean lumber is required, and both processes have seen some in-roads being made by the liquefied petroleum gas process of U.S. Patents Nos. 3,199,211 and 3,200,003.

Recent efforts by utility companies to color their poles to blend with the surroundings, as well as demands by the lumber consumer, for a preserved product which can be painted or stained has stimulated work to develop inexpensive, flexible processes for treating and seasoning.

BRIEF DESCRIPTION OF INVENTION

In accordance with the present invention, wood to be seasoned and/or modified is impregnated with a liquid halogenated solvent or such solvent containing dissolved modifying agents, when modification is to be accomplished, at ambient or elevated temperature under atmospheric or super-atmospheric pressure for a period sufficient to impregnate the wood with the solvent. Thereafter, the excess solvent is removed from wood and the wood heated with a heating medium, e.g., steam or vapors of a halogenated hydrocarbon solvent, which may be the same or different from that employed to impregnate the wood, to remove the impregnant solvent. The temperature to which the system is heated should be below that at which degradation of the wood or solvent occurs. The vapors of the heating medium, water from the green wood and impregnant solvent are withdrawn from the treating zone, condensed and the water separated from the solvent. If steam is being employed as the heating medium, some of the water is returned to the heating step as steam.

DETAILED DESCRIPTION OF INVENTION

In accordance with the present invention, wood is seasoned and/or modified by subjecting the wood to the following steps which comprises the process:

(1) Impregnating wood, in a confined zone, with a halogenated hydrocarbon solvent, either alone or in combination with at least one chemical treating agent when wood modification is practiced, said impregnation being conducted at from about ambient temperature to about 250° F., and under at least sufficient pressure to maintain the solvent in the liquid state at the operating temperature;

(2) Removing excess solvent in said zone from contact with the wood;

(3) Heating the wood and retained solvent with a heat transfer medium;

(4) Withdrawing from the zone solvent vapors and water vapors, if any, evolved from the wood;

(5) Condensing the withdrawn vapors, and (6) Separating the solvent from the water, if any.

Halogenated hydrocarbon solvents which are suitable for use in accordance with the present invention are the polyhalomethanes, polyhaloethanes and polyhaloethylenes having boiling points above about 35° C. (95° F.) and below about 100° C. (212° F.) Exemplary of the preferred solvents are methylene chloride ($CH_2Cl_2$), chloroform ($CHCl_3$), carbon tetrachloride ($CCl_4$), methylene chlorobromide ($CH_2ClBr$), 1,1,1-trichloroethane ($Cl_3CCH_3$)

dibromodifluoroethane (BrFCHCHFBr), dichlorotetrafluoroethane ($ClF_2CCF_2Cl$), trichlorotrifluoroethane ($Cl_2FC \cdot CF_2Cl$)

tetrafluorodibromoethane ($BrF_2C \cdot CF_2Br$), tetrachlorodifluoroethane ($Cl_2FC \cdot CFCl_2$), cis-trans dichloroethylene (ClCH:CHCl), and trichloroethylene ($Cl_2C$:CHCl).

It is to be understood that halogenated hydrocarbon solvents other than those enumerated above such as perchloroethylene, and other solvents having boiling points above 100° C. can be employed, but are not preferred because of the excessively long time required to remove same. Also those which have low flash points such as 1,1-dichloroethane and ethylene dichloride can be employed if proper safety precautions are observed, but are not within the class of preferred solvents.

The heat transfer medium employed to heat the wood and retained solvent is a fluid which can be vaporized and which vapors form between about 95° F. and about 250° F., particularly those which can be heated to at least about 250° F. without decomposition under atmospheric or super-atmospheric pressure. Suitable and preferred medium include water and the aforementioned halogenated hydrocarbons.

The time periods required to carry out each step of the aforedescribed process are not critical and are primarily dependent upon the thickness and the hardness of the wood. In general, sixty minutes is sufficient to impregnate to a depth of about five inches under about 50 p.s.i.g. Likewise, in general, about eight hours is a sufficient period of heating to remove 90% or more of the retained solvent using steam at 100° C. as the heating medium from ten inches thickness wood.

Wood modifying agents which can be employed in accordance with the present invention are those solvent-soluble or solvent-dispersible chemical compounds and resins which are non-volatile below about 265° F. and are stable under the operating conditions or if reactive, such reactivity is confined to benefacting the wood, or stabilizing the agent. Wood modifying agents suitable for use in accordance with the present invention are described below. These modifying chemicals preferably should be soluble, but the solubility need not be great, as for example as little as 0.004 ounce per gallon of solvent is satisfactory for most dyes and as little as about 1.0 weight percent preservative and/or fire retardant is satisfactory. Higher concentrations up to 20 weight percent may be employed, if desired. Generally, the preservatives are employed in from about 2 to 5.5 weight percent, fire-retardants in from 2 to 20 percent by weight and the dyes in from 0.1 to 1.0 percent by weight, all based on the weight of solvent. It is to be understood that other wood modifying agents, such as polymerizable ingredients, e.g., styrene, acrylic monomers and copolymers, which are soluble in the solvent can also be impregnated into the wood in accordance with the present invention.

Suitable wood preservatives for use in the process of this invention include pentachlorophenol, 2,3,4,6-tetrachlorophenol, 2,4,5-trichlorophenol, 2,4,6-trichlorophenol, 4-chloro-2-chloropentylphenol, beta-naphthol, copper naphthenate and phenyl mercury oleate. Other known wood-preservative compounds which are soluble or can be dispersed in the halogenated hydrocarbon solvents useful in this invention may be used.

Suitable fire retardant chemicals which can be impregnated into wood in accordance with the present invention are the tris(haloalkyl)phosphonates, bis(2-chloroethyl) chloroethane phosphonate, tris(2-chloroethyl)phosphonate, tri(2,3-dibromopropyl)phosphate, the aziridinyl phosphine oxides, trisaziridinyl phosphine oxide, and the like.

Suitable dyes which can be employed to color wood in accordance with the present invention are the solvent-soluble dyes identified by name as Solvent Yellow 2 and/or by color index number. Exemplary of the dyes falling within this definition are:

| Solvent: | C.I. |
|---|---|
| Yellow 2 | 11020 |
| Yellow 30 | 21240 |
| Yellow 3 | 11160 |
| Yellow 14 | 12055 |
| Orange 7 | 12140 |
| Red 22 | 21250 |
| Red 24 | 26105 |
| Red 26 | 26120 |
| Red 49 | 45170B |
| Violet 8 | 42535B |
| Violet 13 | 60725 |
| Blue 4 | 44045B |
| Blue 7 | 50400 |
| Blue 11 | 61525 |
| Green 3 | 61565 |
| Green 1 | 42000B |
| Orange 3 | 11270B |
| Brown 12 | 21010B |
| Black 7 | 50414B |
| Black 3 | 26150 |

The use of assistants to improve the characteristics of the modifying agents is also contemplated. For example, the addition of from about 1 to about 10 weight percent of a polyglycol or polyglycol ether to prevent blooming or assist in solubilization of the modifiers is contemplated. Also dye assistants and fixatives can be employed.

Since the impregnating solvent becomes contaminated with wood resins and surface dirt during repeated contact with the wood, it is necessary to clean up the solvent occasionally. Simple distillation is acceptable if the level of modifying agents in the solvent is small. However, this is generally not the case. Therefore, the following procedure can be followed in cleaning the solvent and recovering the modifying agent such as pentachlorophenol:

(1) Add a quantity of petroleum oil, such as employed in the oil treatment of wood with pentachlorophenol, in an amount sufficient to solubilize the modifying agent, e.g., pentachlorophenol, in the solvent to be cleaned;

(2) Distill the solvent from the oil and pentachlorophenol, the treating cylinder is a suitable still;

(3) Condense the solvent and return it to storage; and (4) Use the oil, which now contains all of the modifying agent, to prepare oil formulations for use in the oil treating process.

It is to be understood that either the solvent before clean-up or the oil remaining after clean-up can be filtered to remove particulate matter.

During experiments in which the present process was operated in a commercial size cylinder, it was found advantageous to employ water as the heating medium and that when so employed, some undesirable corrosion of the metal walls or cylinder occurred. To prevent this undesirable effect, it was found advantageous to add an inhibitor selected from the group morpholine and amines having the formula $(R)_3N$ wherein each R represents a $C_{1-10}$ alkyl, $C_{1-10}$ hydroxyalkyl, cyclohexyl or hydrogen and at least one R is an alkyl radical, to the water during steaming. The most convenient manner of adding the amine to the steaming step, whether steam or vapors of hydrocarbon are employed, was to add solvent, having the desired inhibitor, to the treating cylinder during steaming. As a result of these findings, it was determined the concentration of inhibitor in the solvent which is added as make-up should be sufficient to provide between about 0.05 and about 5 percent by weight of the water used for steaming. The amount of solvent added is not critical and since it will be recovered for future use, the amount added is generally equal to that lost during the process. The solvent will then contain between about 1 and about 20 weight percent of the amine inhibitor.

Wood modification with preservative may be achieved by impregnating wood with a solution of the desired preservative in a halogenated solvent and subsequently steaming the treated wood with steam or vapors of a halogenated hydrocarbon to recover the solvent impregnant therefrom. Wood treated in this manner contains little or no residual solvent and is therefore not subject to surface bleeding. The process likewise provides the additional advantage of producing a treated wood product which has no increased flammability, which retains its light color and natural appearance and which does not darken with age due to decomposition of the solvent contained therein.

In general, the wood treating process of the present invention is accomplished by placing wood in the desired physical form such as posts, poles, boards, and the like in a treating container or chamber. The container is then filled with treating solution comprising a wood preservative, such as pentachlorophenol, in a halogenated hydrocarbon solvent. Additionally, a minor amount of a polyether, such as a polypropylene glycol may be added to the solution to prevent "blooming," or surface crystallization, of the preservative upon weathering of the treated wood. Pressure, when needed, is then applied to the container to force the preservative solution into the pores of the wood. When impregnation is complete, the remaining preservative solution is removed from the container and the wood is heated with a fluid heating medium, e.g. steamed or heated with vapors of the halogenated hydrocarbon solvent, to remove the carrier solvent retained in the wood to an extremely low level. The wood, which then has a clean, natural appearance is removed from the cylinder and is ready for use.

The amounts of preservative and the depth of penetration necessary to provide the desired protection are well known to those skilled in the art of wood preservation.

In the case of pentachlorophenol and closely related compounds, a desirable level is from about 0.35 to 0.4 lb. of preservative per cubic foot of wood on a dry weight basis. The preservative should usually penetrate the wood to its center; however, penetration to a depth of about 2½ inches in thick wood, poles, etc., may at times be adequate.

An advantage of the process of the present invention is that halogenated hydrocarbon solvents have the unique ability to penetrate and carry the preservatives into the heartwood of most species. For use in the process of this invention, it is desirable that the liquid halogenated hydrocarbon solvent contain from about 2.0 to about 10 weight percent of pentachlorophenol with from about 4.5 to about 5.5 weight percent being preferred. In the case of other preservatives different concentration ranges may be necessary or desirable.

If pentachlorophenol or other crystalline preservatives are employed, which tend to migrate to the surface of the wood and form a crystalline layer which is often referred to as "blooming," it may be desirable to add to the preservative solution a polyether as an anti-blooming agent. Suitable polyethers include polypropylene glycols, having molecular weights from about 400 to about 4000. Such anti-blooming agents, when employed, are desirably employed in concentrations of up to about 5 weight percent based on the solvent. Concentrations above 5 weight percent may be employed but no additional advantage is achieved thereby.

The treating solution defined above, is impregnated into the wood by soaking, or, if desired, by means of pressure up to about 150 p.s.i.g. The time necessary to impregnate the wood is generally shorter when increased pressure is employed and the period usually ranges from about 30 minutes to several hours when using pressure whereas soaking may require up to 24 hours. The time required to achieve any desirable degree of penetration is also dependent upon other factors such as porosity of the wood being treated. The amount of preservative taken up by the wood will be determined by the solution concentration, the porosity and the moisture content of the wood in addition to the time and pressure mentioned above. The use of additional time and/or pressure beyond that to obtain the desired amount of impregnation is more costly and may tend to increase the difficulty of solvent recovery.

No steaming of the wood prior to impregnation is required when the preservative solution of this invention is employed. Likewise, it has been found that increased temperature does not materially increase the degree or ease of penetration of the preservative solution into the pores of the wood. Therefore, for convenience, it is desirable to operate at or near ambient temperatures, e.g., from about 0° to about 35° C.

Once the impregnation step has been completed, excess preservative solution is drained from the treating cylinder or other treating chamber, and the treated wood is contacted with a fluid heating medium such as steam or vapors of a halogenated solvent which may be from a source outside the cylinder or generated within the cylinder and which may be superheated. Steaming of the wood to remove the solvent therefrom is conveniently conducted at atmospheric pressure with 100° C. steam. Pressure and correspondingly higher temperature steam, or vapors, e.g., superheated vapors, however, may be employed to reduce the solvent recovery time and to achieve improved recoveries where higher boiling chlorinated solvents have been employed. The time required to achieve adequate solvent recovery depends on the nature of the solvent employed and the particular wood being used. For example, methylene chloride may be adequately removed from a ponderosa pine log by contact with a flow of steam for about 10 hours whereas removal of methyl chloroform, from a similar log, requires about 20 hours and perchloroethylene requires about 24 hours. The vapors from the steaming step, which contain steam and halogenated hydrocarbon solvent, are condensed, the aqueous and organic phases are separated and the solvent phase is available for reuse in the impregnation step. The aqueous phase may be returned to the steam source. When the halogenated hydrocarbon vapors are employed to heat the wood, a mere division of condensed solvent is necessary.

The improved process of this invention finds particular utility in the preparation of wood for use in railroad cross-ties, utility poles, cross-arms, fence posts, piles for both marine and land use, poles for the pole-type buildings, bridge, mine, cooling tower and other structural wood timbers and is particularly useful where it is desirable to retain the natural appearance of the wood, where the treated wood is to be painted, stained or where, for any reason, solvent bleeding to the surface of the wood is undesirable.

The following examples are provided to more fully illustrate the invention but are not to be construed as limiting to the scope thereof.

Example 1

Four seasoned (air-dried) ponderosa pine wood posts 12 feet long and 7 inches in diameter were placed in a treating cylinder 13 feet long and 2 feet in diameter. The cylinder was filled with a solution containing 4.93 weight percent pentachlorophenol and 2.3 weight percent of a polypropylene glycol having an average molecular weight of 750 in a methylene chloride solvent. The cylinder was then sealed and additional preservative solution of the same composition was pumped into the cylinder to provide and maintain a constant pressure of 100 p.s.i.g. for one hour at a temperature of 20° C. During this period, the posts absorbed 150 lbs. of solution. At the end of the period, excess solution was removed from the cylinder and the treated posts were contacted with a flow of steam at 100° C. for a period of about 10 hours to remove the chlorinated solvent therefrom. The products of the steaming step were condensed and the phases separated. It was found that substantially all of the original chlorinated solvent had been recovered by the steam stripping process. In the first 5–6 hours 90% of the solvent absorbed by the posts was recovered.

The impregnated posts were then removed from the cylinder and found to have retained their clear natural color which remained unchanged after 60 days weathering. The moisture content which was originally 17% was found to be unchanged.

Example 2

For comparative purposes, the same kind, size and number of posts were treated with a solution of perchloroethylene containing 4.42 percent by weight of pentachlorophenol and 2.3 percent by weight of the polypropylene glycol in the manner above set forth. The treatment was carried out for 30 minutes at 15° C. at a pressure of 50 p.s.i.g. during which time 306 pounds of solution was absorbed by the logs. The residual solution was drained from the cylinder and the logs were steamed for 24 hours at 100° C. which accomplished recovery of only 90% of the original solvent. The treated posts had retained their original natural color and continued to retain their natural color even after 60 days of exposure to the weather.

Example 3

The process of Example 2 was repeated using a 4.60 percent by weight solution of pentachlorophenol in methyl chloroform which also contained 2.3% of the same polyglycol used in Example 1. Pressure was maintained at 50 p.s.i.g. for 30 minutes at 19° C. and the logs were steamed at 100° C. for 20 hours. Ninety-five percent of the original solvent was recovered, ninety percent of it in the first 14 hours. These logs also were observed to have a natural color which was unchanged after 60 days weathering.

Example 4

Four seasoned ponderosa pine poles, 12 feet in length and 5½ inches to 7 inches in diameter (total of 13.13 ft.³) were placed in a wood treating cylinder. The cylinder was filled with a solution which consisted of 4.47 weight percent, based on total weight of solution, of pentachlorophenol dissolved in the methylene chloride. Additional solution was pressured into the cylinder with a pressure pump until a pressure of 100 p.s.i.g. was obtained. The pressure was maintained at 100 p.s.i.g. for thirty minutes. The pressure was released from the system, and the excess solution was pumped to the storage tank. The poles impregnated with the solution were removed from the cylinder and were weighed. 382.5 lbs. or approximately 28.4 lb./ft.³ of solution were pressured into the poles. The treated poles were replaced in the cylinder and were steamed at 120° C. and 18 p.s.i.g. to reclaim the methylene chloride from the wood. After 11.5 hours of steaming, 361 lbs. of methylene chloride (equivalent to a 98.8% recovery of the methylene chloride) were recovered from the wood. The resulting poles had a clean, natural appearance that was suitable for painting. No evidence of "blooming" of the pentachlorophenol was present. Analysis of core samples from the wood showed the average pentachlorophenol penetration over a four inch depth to be 0.75 lb./ft.³.

In general, the dyeing of wood according to the process of the present invention is accomplished by placing wood in the desired physical form in a treating container or chamber. The container is then filled with treating solution comprising a halogenated hydrocarbon solvent soluble dye in a halogenated hydrocarbon solvent. Additionally, a minor amount of dye assists, dye fixatives, etc., such as a polypropylene glycol may be added to the solution to prevent "blooming," or surface crystallization, of the dye upon weathering of the treated wood. Pressure, when needed, is then applied to the container to force the dye solution into the pores of the wood. When impregnation is complete, the remaining dye solution is removed from the container and the wood is heated with a fluid medium, e.g., steam or a halogenated hydrocarbon solvent, to remove the carrier solvent and reduce that retained in the wood to an extremely low level. The wood, which then has been dyed is removed from the cylinder and is ready for use.

The amounts of dye and the depth of penetration necessary to provide the desired protection are well known to those skilled in the art of wood preservation. A desirable level is from about 0.007 to about 100 ounces of dye per gallon of solvent. The dye should usually penetrate the wood to its center. However, penetration to a depth of about 2½ inches in thick wood, poles, etc., may at times be adequate.

The condition, time, pressures and temperatures for impregnating the dye solution into the wood are substantially those aforedescribed in the description of the preservative treatment above. The amount of dye taken up by the wood will be determined by the solution concentration and the porosity of the wood in addition to the time and pressure mentioned above. The use of additional time and pressure beyond the desired amount of impregnation are more costly and may tend to increase the difficulty of solvent recovery.

No steaming of the wood prior to impregnation is required when the dye solution of this invention is employed. Likewise, it has been found that increased temperature does not increase the penetration or the ease of penetration of the dye solution into the pores of the wood. Therefore, for convenience, it is desirable to operate at or near ambient temperatures, e.g., from about 0° C., to about 35° C.

Once the impregnation step has been completed, excess dye solution is drained from the treating cylinder or other treating chamber, and the treated wood is heated with a fluid medium, e.g., steam or the vapors of a halogenated solvent, which may be from a source outside the cylinder or generated within the cylinder. The heating of the wood to remove the halogenated solvent therefrom is conducted in the same manner as aforedescribed.

The improved process of this invention finds particular utility in the preparation of wood for use in railroad crossties, utility poles, cross-arms, fence posts, piles for both marine and land use, poles for the pole-type buildings, bridge, mine, cooling tower and other structural wood timbers and is particularly useful where it is desirable to color the wood. It is be understood that the dyeing may be conducted simultaneously with the seasoning and/or with other modification processes within the scope of the present invention.

The following example is provided to more fully illustrate the invention but is not to be construed as limiting to scope thereof.

Example 5

In a representative operation a seasoned ponderosa pine utility pole section was introduced into a treating cylinder which was filled with a solution of methylene chloride containing 4.56 percent by weight, based on the weight of the solvent, of pentachlorophenol and 0.12 percent by weight of a dye formulation prepared by blending 66.6% by weight Sudan Yellow GRN (Solvent Yellow 29, C.I. 21230) and 33.4% by weight of Sudan Green 4B (Solvent Green 3, C.I. 61565). The cylinder was pressurized with additional solution to maintain 100 p.s.i.g. ambient temperature, over a one-hour period. The pressure was released after the one hour pressurization and the cylinder drained of solution. It was found that ten and one-half pounds of solution had been pressured into the wood. The wood was then steamed with 120° C. steam for ten hours. Substantially all of the methylene chloride was recovered. The poles had a light green color almost that of Sudan Emerald. The preservative was present throughout the interior of the poles including the heartwood.

In general, the seasoning of wood according to the process of the present invention is accomplished by placing wood in the desired physical form in a treating container or chamber. The container is then filled with an impregnating fluid, e.g., a halogenated hydrocarbon solvent. Pressure, when needed, is then applied to the container to force the fluid into the pores of the wood. When impregnation is complete, the remaining fluid is removed from the container and the wood is heated with a fluid heating medium such as steam or vapors of a halogenated hydrocarbon solvent to remove the solvent retained in the wood and moisture of the wood to an extremely low level, in the latter case 15–20 percent by weight. The wood, which then has a clean, natural appearance is removed from the cylinder and is ready for use. The process may be conducted under super-atmospheric pressure with superheated vapors. Temperatures should not exceed 265° F. for periods of more than twelve hours. After this treatment, the wood is treated in the aforedescribed manner to remove the solvent.

It is to be understood that seasoning may be accomplished simultaneously with modification of the wood. The steps and conditions are substantially the same except the fluid for impregnation contains the modifying agent such as preservative and/or colorant.

We claim:

1. A process for seasoning green wood which consists essentially of the steps of impregnating green wood with a liquid halogenated hydrocarbon solvent at from about ambient temperature to about 250° F. and at from about atmospheric to superatmospheric pressure, removing excess solvent from association with the wood, and subjecting the so-impregnated wood to the vapors of water to remove the impregnant solvent and water, and removing the so-vaporized solvent and water from association with the wood, separating the solvent from the water and recovering the solvent for reuse.

2. A process for the seasoning and modification of green wood which comprises submerging the green wood in a liquid halogenated hydrocarbon solvent which contains a modifying agent at from about ambient to about 250° F. at from about atmospheric pressure to about 150 p.s.i.g. for a period sufficient to impregnate the wood with the solvent, thereafter draining the excess solvent from wood and heating the wood with steam for a time sufficient to raise the wood and impregnant solvent to a temperature above that of the boiling point of the impregnant solvent, removing the vapors of the heating medium, water from the green wood and impregnant solvent from the treating zone, condensing the vapors and separating the water from the solvent.

3. A process for seasoning green wood which comprises subjecting the green wood to the following steps:
   (1) Impregnating, in a confined zone, green wood with a halogenated hydrocarbon solvent, said impregnation being conducted, at from ambient temperature to about 250° F., and under at least sufficient pressure to maintain the solvent in the liquid state at the operating temperature;
   (2) Removing excess solvent in said zone from contact with the wood;
   (3) Heating the wood and retained solvent with steam to above the boiling point of the solvent;
   (4) Withdrawing from the zone solvent vapors and water vapors evolved from the wood;
   (5) Condensing the withdrawn vapors; and
   (6) Separating the solvent from the water.

4. A process for seasoning and modifying green wood which comprises subjecting the green wood to the following steps:
   (1) Impregnating, in a confined zone, green wood with a halogenated hydrocarbon solvent having dissolved therein at least one chemical treating agent, said impregnation being conducted, at from ambient temperature to about 250° F., and under at least sufficient pressure to maintain the solvent in the liquid state at the operating temperature;
   (2) Removing excess solvent in said zone from contact with the wood;
   (3) Heating the wood and retained solvent with steam to above the boiling point of the solvent;
   (4) Withdrawing from the zone vapors of said heating medium and the solvent vapors evolved from the wood;
   (5) Condensing the withdrawn vapors; and
   (6) Separating the solvent from the water.

5. A process for the treating of green wood to season and to preserve the same which comprises:
   (1) Impregnating, in a confined zone, green wood with a halogenated hydrocarbon solvent containing at least one organic preservative which is soluble in said solvent, said impregnation being conducted, at from ambient temperature to about 250° F., and under at least sufficient pressure to maintain the solvent in the liquid state at the operating temperature;
   (2) Removing excess solvent in said zone from contact with the wood;
   (3) Heating the wood and retained solvent with steam to above the boiling point of the solvent;
   (4) Withdrawing from the zone the vapors of said heating medium and the solvent vapors evolved from the wood;
   (5) Condensing the withdrawn vapors; and
   (6) Separating the solvent from the water.

6. The process of claim 5 wherein the pressure is from about 15 to about 150 p.s.i.g.

7. The process of claim 5 wherein the solvent is methylene chloride.

8. A process according to claim 5 wherein the wood preservative solution additionally contains up to about 5 weight percent of a polyether as an antiblooming agent.

9. The process of claim 8 wherein the polyether is a polypropylene glycol having an average molecular weight of between about 400 and 4000.

10. The process of claim 5 wherein the preservative concentration in the solvent is from about 2 to about 5.5 weight percent.

11. The process of claim 10 wherein the preservative is pentachlorophenol.

12. A process for seasoning green wood and introducing a wood preservative into said wood which comprises:
   (1) Impregnating, in a confined zone, green wood with a halogenated hydrocarbon solvent containing at least one organic preservative chemical which is soluble in said solvent, said impregnation being conducted, at from ambient temperature to about 250° F., and under at least sufficient pressure to maintain the solvent in the liquid state at the operating temperature;
   (2) Removing excess solvent in said zone from contact with the wood;
   (3) Heating the wood and retained solvent with steam to above the boiling point of the solvent;
   (4) Withdrawing from the zone vapors of said heating medium and the solvent vapors and water evolved from the wood;
   (5) Condensing the withdrawn vapors; and
   (6) Separating the solvent from the water.

13. A process according to claim 12 wherein the preservative is a polyhalophenol wood preservative.

14. The process of claim 13 wherein said solvent is methylene chloride.

15. A process for seasoning and coloring green wood which comprises:
   (1) Impregnating, in a confined zone, green wood with a halogenated hydrocarbon solvent containing a solvent-soluble dyestuff, said impregnation being conducted, at from ambient temperature to about 250° F., and under at least sufficient pressure to maintain the solvent in the liquid state at the operating temperature;
   (2) Removing excess solvent in said zone from contact with the wood;
   (3) Heating the wood and retained solvent with vapors of a heat transfer medium, to above the boiling point of the solvent;
   (4) Withdrawing from the zone the vapors of said heating medium and the solvent vapors evolved from the wood;
   (5) Condensing the withdrawn vapors; and
   (6) Separating the solvent from the vapors of the heating medium if different from the solvent.

16. The process of claim 15 wherein the solvent is methylene chloride and the heating medium is steam.

References Cited

UNITED STATES PATENTS

| 2,650,885 | 9/1953 | Hudson | 117—147 X |
| 2,860,070 | 11/1958 | McDonald | 117—59 |
| 3,039,843 | 6/1962 | Chamberlain | 21—7 X |

FOREIGN PATENTS

| 1,068,883 | 11/1959 | Germany. |
| 519,730 | 12/1955 | Canada. |

MORRIS O. WOLK, Primary Examiner

S. MARANTZ, Assistant Examiner

U.S. Cl. X.R.

8—6.5; 34—9.5, 13.8, 16.5; 117—59, 102 R, 147, 149; 252—380, 387